United States Patent [19]

Butera

[11] Patent Number: 4,578,894

[45] Date of Patent: Apr. 1, 1986

[54] RELAXING ANIMAL SNARE

[76] Inventor: Richard E. Butera, 2935 Lynn Dr., Willoughby Hills, Ohio 44092

[21] Appl. No.: 507,708

[22] Filed: Jun. 23, 1983

[51] Int. Cl.$^4$ ............................................. A01M 23/34
[52] U.S. Cl. .................................... 43/87; 24/115 F; 43/85
[58] Field of Search ................ 43/87, 85, 86; 24/1, 24/115 F

[56] References Cited

U.S. PATENT DOCUMENTS

| | | | |
|---|---|---|---|
| 1,600,756 | 9/1926 | Fairbanks | 43/87 |
| 1,615,586 | 1/1927 | Kleffman | 43/87 |
| 1,732,919 | 10/1929 | Thompson | 43/87 |
| 1,738,907 | 12/1929 | Kleffman | 43/87 |
| 1,776,782 | 9/1930 | Carr et al. | 43/87 |
| 1,841,872 | 1/1932 | Bjornseth | 43/87 |
| 1,933,855 | 11/1933 | Johnson | 43/87 |
| 2,537,894 | 1/1951 | Haviland | 43/87 |
| 2,683,952 | 7/1954 | Armstrong | 43/87 |
| 4,083,142 | 4/1978 | Gregerson | 43/87 |

Primary Examiner—Nicholas P. Godici
Assistant Examiner—Kurt Rowan
Attorney, Agent, or Firm—Renner, Otto, Boisselle & Lyon

[57] ABSTRACT

A relaxing snare for trapping animals comprising a noose having a constrictable loop for ensnaring an animal therein by tightening of the loop about the animals's neck upon the animal tugging thereagainst, and a lost motion locking slide device for relaxing the tightness of the constricting loop in the absence of such tugging by a preselected limited amount of tension which is great enough to prevent strangulation of the animal yet small enough to prevent escape of the animal by withdrawal of its head through the loop when relaxed. This controlling feature is directly opposed to the strangulation resulting from use of the standard locking type snare and allows the selection and releasing of non-target animals. Various forms of a lost motion locking slide device are disclosed.

18 Claims, 20 Drawing Figures

RELAXING ANIMAL SNARE

DISCLOSURE

This invention relates generally to animal snares and, more particularly, to relaxing animal snares which ensure retention of a snared animal without choking the animal to death.

BACKGROUND

Snares have been commonly recognized to be an effective means for capturing small animals such as rabbits and larger animals such as foxes, coyotes and wolves. Typically, the snare consists of a length of flexible cable such as wire or rope which is threaded through a locking slide or slip member to which one end of the cable is joined or connected to form a loop or noose. The snare loop may be adjusted in size and suspended at an appropriate height for selective capture of the animal being sought.

As is common practice, the snare is set along a runway or path frequently traveled by the animal. When the animal runs along the path and inserts its head into the snare loop, the resultant pulling or tugging on the snare causes the loop to tighten about the animal's neck. Once the loop is secured about the animal's neck, any continued struggling by the animal only serves to futther tighten the snare loop and often to a point resulting in strangulation of the animal.

Although conventional snares have a number of advantages over other types of animal traps, one major drawback has been the aforementioned resultant strangulation of the snared animal as it struggles to escape the snare. Primarily for this reason, the use of snares has been outlawed in many areas throughout the United States.

One attempt to obviate this drawback has involved the use of an adjustable stop to define a minimum constricted size of the snare loop. In theory, the stop could be set to limit loop constriction to a point that would not result in strangulation of the snared animal and yet be sufficient to prevent escape of the animal. In practice, however, any error in setting the stop in either direction results in undesirable consequences, i.e., either strangulation of the animal by too small a setting or escape of the animal by too large a setting. Moreover, there is no assurance against an animal larger than that being sought from being snared and strangled.

Accordingly, there has been a long felt need for a snare which ensures retention of the snared animal while protecting against strangulation of the animal.

SUMMARY OF THE INVENTION

Towards satisfaction of this long felt need, the present invention provides a relaxing snare which can tighten closely about the neck of the snared animal pulling or tugging thereagainst and then loosen a preselected limited amount when the animal ceases such tugging to prevent strangulation while still ensuring retention of the animal. Moreover, strangulation is protected against even if a different animal than that being sought is inadvertently snared.

Briefly stated, a relaxing snare according to the invention comprises a noose having a constrictable loop for ensnaring an animal therein by tightening of the loop about the animal's neck upon the animal tugging thereagainst, and a lost motion locking slide device for releasing the tightness of the constricted loop in the absence of such tugging by a preselected limited amount which is great enough to prevent strangulation yet small enough to prevent escape of the animal by withdrawal of its head through the loop when relaxed.

More particularly, the snare is formed by a length of flexible cable having an anchor end and a loop end operably connected to and for advancement along an intermediate portion of the cable by the lost motion locking slide device so as to form the constrictable loop. The lost motion locking slide device is characterized by a slide lock which is advanceable along the cable and engageable therewith to prevent reverse movement, and a lost motion connection between the cable's loop end and the slide lock which provides for advancement of the slide lock along the cable by the tightening action of the loop after a predetermined amount of slack in the connection has been taken up and for reintroduction of such slack into the loop upon cessation of the tightening action. Representative forms of the lost motion connection are more particular described hereinafter.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION

Figures 1, 2, 3, 4, 5, 6, 7:
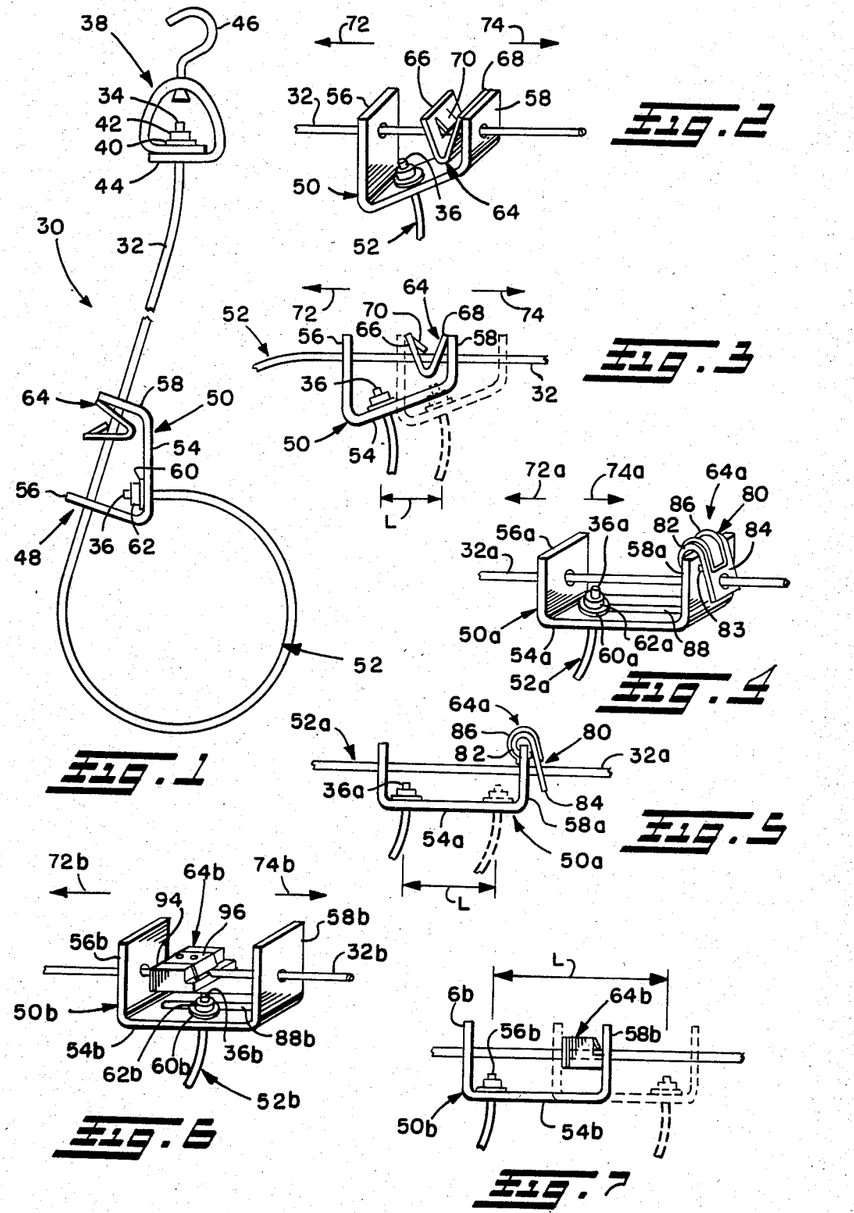
FIG. 1 is an elevational view of a relaxing animal snare according to the invention.
FIG. 2 is a perspective view of the lost motion locking slide device utilized in the snare of FIG. 1.
FIG. 3 is an elevational view of the device of FIG. 2 with tightened and relaxed conditions thereof being shown in solid and phantom lines, respectively.
FIG. 4 is a perspective view of a modified form of lost motion locking slide device.
FIG. 5 is an elevational view of the device of FIG. 4 with tightened and relaxed conditions thereof being shown in solid and phantom lines, respectively.
FIG. 6 is a perspective view of another modified form of lost motion locking slide device embodying features taken from the devices of FIGS. 2 and 4 to provide for double relaxation movements.
FIG. 7 is an elevational view of the device of FIG. 6 with tightened and relaxed conditions thereof being shown in solid and phantom lines, respectively.

Referring now in detail to the drawings and initially to FIG. 1, a relaxing snare according to the invention is designated generally by reference numeral 30. The snare 30 includes a length of flexible cable 32, such as multiwire steel cable or rope, which has opposite ends here denoted as an anchor end 34 and a noose or loop end 36. At its anchor end 34, the cable is threaded into a swivel device 38 and secured thereto against pull-out by a washer 40 and crimped sleeve or ferrule 42. As shown, the anchor device has a body portion 44 to which the cable is secured and a free turning hook 46 which provides for convenient suspension of the snare from an overhead support.

The snare 30 also includes a loop closure consisting of a lost motion locking slide device designated generally by reference numeral 48. The device 48 includes a slide or saddle 50 mounted for sliding movement on an intermediate portion of the cable 32. The loop end 36 of the cable is connected to the saddle so as to form a loop 52 which is expandable or contractible upon corresponding movement of the saddle 50 towards and away from the anchor end 34 of the cable, respectively.

The saddle 50 is a generally U-shape, rigid bent strip having a connecting portion 54 and substantially parallel, spaced apart leg portions 56 and 58. At its loop end 36, the cable 32 is threaded through a hole in the connecting portion 54 and fixed against pull-out by a washer 60 and crimped sleeve or ferrule 62.

As best seen in FIG. 2, the leg portions 56 and 58 have aligned holes therein through which the intermediate portion of the cable 32 is threaded. Such holes are oversized to allow longitudinal sliding movement or slippage of the saddle 50 along the length of the cable. As is apparent, movement (advancement) of the saddle away from the anchor end 34 of the cable will constrict or reduce the size (circumferential length) of the loop 52 whereas movement in the opposite direction (reverse movement) would expand or increase the size of the loop.

As shown, the leg portions 56 and 58 are at right angles to the cable 32 and are spaced apart along the length of the cable to provide limited relative movement between the saddle 50 and a slide lock 64 located on the cable between such leg portions. That is, the saddle can freely move along the cable relative to the slide lock until either leg portion 56, 58 thereof engages a corresponding side of the slide lock. Since the loop 52 normally is suspended beneath the anchor end 34 of the cable, the leg portion 58 of the saddle normally will be supported atop the slide lock 64 as seen in FIG. 1. As also seen in FIG. 1, the connecting portion 54 of the saddle may be inclined to the planes of the leg portions 56 and 58 to space the loop end 36 of the cable further from the intermediate portion of the cable to provide adequate clearance between such loop end and the slide lock 64 while minimizing overall size of the saddle.

The slide lock 64 is a generally V-shape bent strip which preferably is made of spring steel or the like. The legs 66 and 68 of such strip form an acute angle therebetween and have aligned holes through which the cable 32 is threaded. The slide lock 64 also has a locking detent or tab 70 which operates to prevent reverse movement of the slide lock towards the anchor end 34 of the cable while allowing sliding movement (advancement) of the slide lock in the opposite direction. The locking tab 70 is formed from the distal end portion of the leg 66 furthest the anchor end 34 and angles inwardly to ride on the cable. As shown, the tab forms an acute angle with the cable which opens away from the cable anchor end whereby the tab can slide along the cable upon movement of the slide lock away from the anchor end of the cable in the direction indicated by arrow 72. On the other hand, the tab has a sharp cornered edge adapted to bite into the cable to prevent reverse movement of the slide lock in the direction indicated by arrow 74.

When not assembled on the cable 32, the slide lock 64 may have a non-flexed condition wherein the V thereof is more open or closed than as seen in FIGS. 1 and 2. Accordingly, when assembled on the cable, the legs 66 and 68 will be slightly biased away from or towards each other slightly to bind the cable therein so that the slide lock will be frictionally held against movement in the absence of applied force. The binding force desirably is sufficient to support the weight of the saddle 50 and the weight of the loop 52 acting on the saddle when the snare is suspended in the manner illustrated in FIG. 1, whereby the slide lock may be adjustably positioned along the cable to provide and maintain a desired size of the loop 52.

To place the snare 30 in use, the loop 52 is first formed to a suitable size for the particular animal to be snared by adjusting the position of the slide lock 64, and consequently the saddle 50, along the intermediate portion of the cable 32. The snare then may be set along a runway or path normally traveled by the animal as by securing the swivel hook 46 to a tree, suitable drag or other overhead support which is anchored to prevent the animal from running off with the snare. As is customary, the loop is suspended at an appropriate height above the ground for receipt of the animal's head as it travels along the path.

When the animal inserts its head through the loop 52 and begins tugging thereagainst in an effort to free itself, the resultant force acting on the loop end 36 of the cable will pull or draw the saddle 50 along the cable to constrict or tighten the loop about the animal's neck. Such pulling of the saddle away from the anchored end 34 of the cable in turn will similarly advance the slide lock 64 with such slide lock being urged along the cable by the trailing leg portion 58 of the saddle. As the animal struggles to escape, the saddle and slide lock will continue to be advanced until the loop is fully tightened about the animal's neck.

The animal might continue to struggle until it becomes exhausted or passes out from loss of breath caused by the tightly constricted loop 52. In any event, when the animal ceases tugging, the lost motion locking slide device 48 will introduce a preselected limited amount of slack or looseness L into the loop so that the animal can continue to breath. As seen in FIG. 3, releasing or loosening movement of the saddle 50 from its tightened position seen in solid lines is permitted until the leading leg portion 56 of the saddle engages the slide lock 64 as seen in phantom lines. At this point, further reverse movement of the saddle is prevented by the slide lock which cannot be reversely moved by reason of the locking tab 70 being urged into biting or binding engagement with the cable 32.

The amount of slack L to be introduced into the loop 52, i.e., the amount of relative movement permitted between the saddle 50 and slide lock 64, is preselected so as to be appropriate for the animal to be snared. The slack, however, should always be sufficient to allow any animal that might be snared to breath upon relaxation of the loop. On the other hand, the introduced slack should not allow the constricted loop to assume a size that allows the animal to withdraw its head from the loop when relaxed. Accordingly, a greater amount of slack may be chosen for animals having a relatively large head in proportion to neck size and a lesser amount of slack for animals having a relatively small head to neck size ratio to ensure animal retention while protecting against strangulation. The amount of slack may be selected by choosing a saddle having the desired longitudinal spacing between the leg portions 56 and 58.

In essence, the saddle 50 provides a lost motion connection between the loop end 36 of the cable 32 and the slide lock 64. The tightening action of the loop caused by the tugging of the animal thereagainst will advance the slide lock along the cable only after the preselected amount of slack L has been taken up. When the tightening action ceases, such slack is reintroduced into the loop to prevent strangulation. As will be seen below, other forms of lost motion connections may be utilized with equivalent and/or desirable results.

DESCRIPTION OF ALTERNATE EMBODIMENTS.

Referring now to the alternate embodiments shown in FIGS. 4-20, like reference numerals designate like parts in the several figures, and alphabet letter suffixes are used with common reference numbers to designate corresponding, but not necessarily similar or totally alike, parts of the several embodiments, as will be apparent.

In FIGS. 4 and 5, a modified slide or saddle 50a is advanceable along the cable 32a in the direction indicated by arrow 72a (away from the anchor end of the cable) but precluded from reverse movement by another type of slide lock 64a including a pawl-like member 80, herein referred to as a pawl. The pawl 80 is a metal strip having one end bent to form a loop or eye 82 which is circumferentially movable in a transverse slot 83 provided in the leg portion 58a of the saddle 50a. At its other end, the pawl 80 has a relatively straight portion 84 provided with a hole through which the cable is threaded. Such relatively straight portion forms an acute angle with the cable that opens away from the anchor end of the cable (in the direction of arrow 72a) so that the pawl will ride on the cable as the saddle is advanced in the direction indicated by arrow 72a by the tightening action of the loop 52a when an animal tugs or pulls thereagainst. On the other hand, any forcing of the saddle in the reverse direction indicated by arrow 74a will cock the pawl into binding engagement with the cable to prevent any appreciable reverse movement of the saddle. To ensure such binding engagement, the pawl 80 may be resiliently urged against the cable by a spring element 86 which may consist of spring wire bent as shown. The biasing force also will assist in holding the saddle against movement along the cable in the direction indicated by arrow 72a while yielding to allow such movement upon an animal tugging against the snare loop 52a.

To provide for introduction of slack into the loop after constriction and upon cessation of tugging by an animal thereagainst, the saddle 50a has a longitudinally extending slot 88 provided in the connecting portion 54a thereof which generally extends parallel to the cable passing between the leg portions 56a and 56a of the saddle. The loop end 36a of the cable 32a is threaded through such slot 88 and secured against pull-out by a washer 60a and a crimped sleeve or ferrule 62a. The width of the slot 88 is slightly greater than the outer diameter of the cable so that the loop end of the cable can longitudinally move in the slot between the positions seen in solid and phantom lines in FIG. 5.

In operation, the tightening action of the snare loop 52a caused by tugging of an animal thereagainst will advance the saddle 50a along the cable 32a only after the loop end 36a of the cable engages the leading end wall of the slot 88. When the animal ceases tugging, the cable loop end 36a can move freely in the slot towards the trailing end thereof to relax or loosen the snare loop by increasing the circumferential length of the loop. However, the maximum relaxed size of the loop will be limited by engagement of the cable loop end 36a with the trailing end wall of the slot 88, it being noted that reverse movement of the saddle 50a is precluded by the binding action of the pawl 80.

Referring now to FIGS. 6 and 7, it will be seen that respective features taken from the embodiments of FIGS. 1-3 and FIGS. 4 and 5 may be combined to provide double loop relaxing or releasing movements. Like in the FIGS. 4 and 5 embodiment, the cable loop end 36b is threaded through a longitudinally extending slot 88b in the connecting portion 54b of saddle 50b and secured against pull-out by a washer 60b and crimped sleeve or ferrule 62b. The slot 88b generally extends parallel to the cable 32b passing between the leg portions 56b and 58b of the saddle and provides for longitudinal movement of the cable loop end 36b relative to the saddle. Further, the leg portions of the saddle, like in the FIGS. 1-3 embodiment, are disposed on opposite sides of a slide lock 64b having a longitudinal dimension less than the spacing between such leg portions. Accordingly, the relative movements between the cable loop end and the modified saddle and between the modified saddle and the slide lock together provide a combined slack indicated at L.

As seen in FIG. 6, the slide lock 64b includes a body portion 94 having a longitudinal bore through which the cable 32b is threaded. The body portion also is recessed for receipt of an L-shape locking detent or tab 96 made of spring metal or the like. One leg of the tab is riveted or otherwise secured to the top of the body whereas the other leg angles downwardly to engage the cable at an acute angle. The locking tab allows movement of the slide lock in the direction indicated by arrow 72b while preventing movement in the opposite direction indicated by arrow 74b by biting or binding engagement with the cable.

Figures 8, 9, 10, 12, 13, 14, 15:
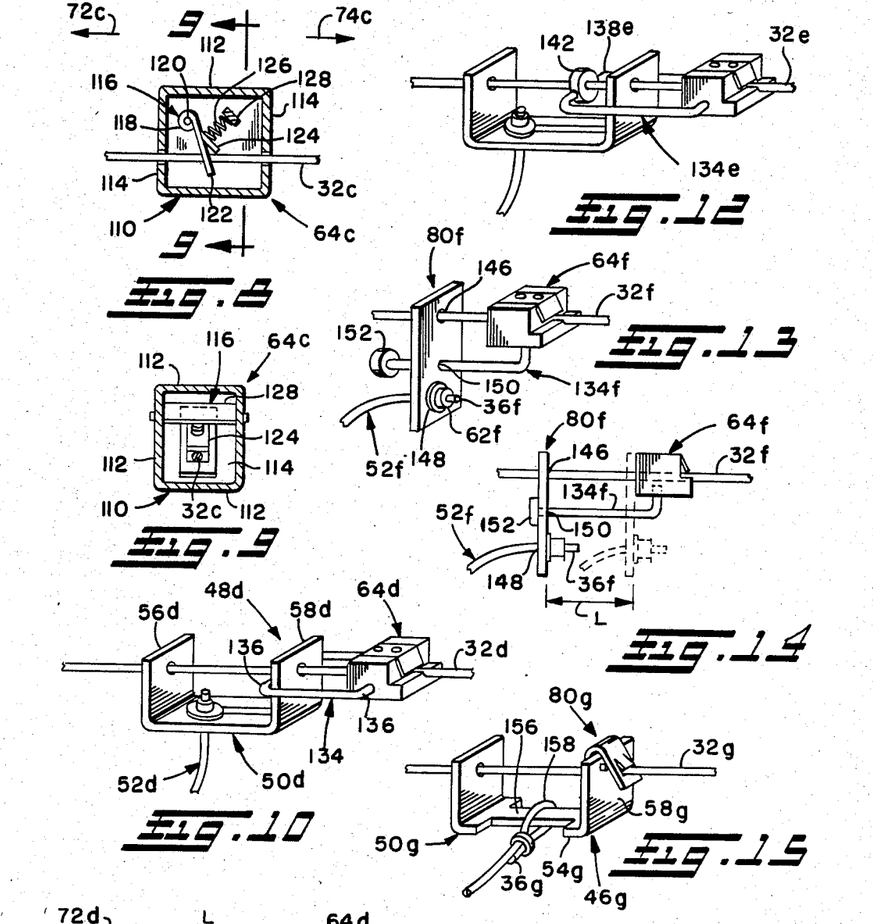
FIG. 8 is a longitudinal section through a slide lock having application in various forms of the lost motion locking slide device of the invention.
FIG. 9 is a transverse sectional view of the slide lock of FIG. 8 taken substantially along the line 9—9 thereof.
FIG. 10 is a perspective view of another type of lost motion locking slide device according to the invention, utilizing a tag-along slide lock.
FIG. 12 is a perspective view of a modified form of lost motion locking slide device utilizing a tag-along slide lock.
FIG. 13 is a perspective view of another modified form of lost motion locking slide device utilizing a tag-along slide lock.
FIG. 14 is an elevational view of the device of FIG. 13, with tightened and relaxed conditions thereof being shown in solid and phantom lines, respectively.
FIG. 15 is a perspective view of still another type of lost motion locking slide device according to the invention.

In FIGS. 8 and 9, another type of slide lock is designated generally by reference numeral 64c and may be utilized, for example, in place of the aforedescribed slide locks 64 and 64b. The slide lock 64c includes a rectangular housing 110 having side walls 112 and end walls 114. End walls 114 have aligned holes therein through which the intermediate portion of the cable 32c is threaded. Such holes are oversized to allow longitudinal sliding movement of the housing along the length of the cable.

The slide lock 64c also has a locking element or pawl 116 in the form of a metal strip having one end bent to form a loop or eye 118 disposed about a pin 120 extending and fixed between one pair of opposed parallel side walls 112. At its other end, the pawl has a relatively straight portion 122 provided with a hole through which the cable 32c is threaded. Such locking element also has a locking detent or tab 124 formed from the straight portion 122 which rides on and forms an acute angle with the cable that opens in the direction indicated by arrow 72c. The locking element 124 is normally biased into engagement with the cable by a spring 126 disposed between the straight portion 122 and an abutment 128 fixed to the housing 110. Like the other slide locks, the slide lock 64c is advanceable in the direction indicated by arrow 72c while appreciable reverse movement thereof is prevented by biting or binding engagement of the pawl with the cable.

Figure 11:
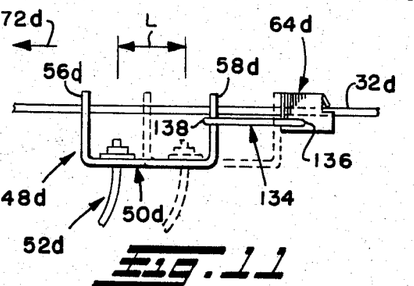
FIG. 11 is an elevational view of the device of FIG. 10 with tightened and relaxed conditions thereof being shown in solid and phantom lines, respectively.

Referring now to FIGS. 10 and 11, another type of lost motion locking slide device is designated generally by reference numeral 48d. The device 48d includes a slide or saddle 50d and an slide lock 64d both mounted for sliding movement on the cable 32d. Unlike the aforedescribed slide locks, the slide lock 64d of the device 48d is located on the cable to the rear of the saddle 50d.

The slide lock 64d is advanceable along with the saddle 50d in the direction indicated by arrow 72d by means of a tag-along connecting member or arm 134. The connecting arm 134 is generally U-shape and is fixed at its open end 136 to opposite sides of the slide lock 64d. At its closed end 138, the connecting member is trapped by the cable 32d between the leading and trailing end portions 56d and 58d of the saddle 50d for limited longitudinal movement between such end portions.

In use, tugging by an animal against the snare loop 52d will advance the saddle 50d along the cable 32d to constrict the loop about the animal's neck. The slide lock 64d also will be advanced along the cable, but in trailing relation to the saddle, by engagement of the trailing leg portion 58d of the saddle with the closed end 138 of the connecting arm 136. When the tightening action ceases, the saddle is free to move in the reverse direction until it engages the slide lock which prevents further reverse movement of the saddle. As will be appreciated, the longitudinal length of the connecting arm and/or longitudinal spacing between the leg portions 56d and 58d may be selected to provide for the desired amount of slack that can be introduced into the snare loop when the tightening action ceases.

In FIG. 12, a modified form of connecting arm can be seen at 134e. The connecting arm 134e at its closed end 138e has a flat boss 142 which has a hole through which the cable 32e is threaded. As will be appreciated, the device shown in FIG. 12 will operate similarly to the device shown in FIGS. 10 and 11.

In FIG. 13, a traveler or slide 50f is in the form of a single plate or strip. Such strip has three transversely spaced holes, the cable 32f at its intermediate portion being threaded through one hole at 146 and having its loop end 36f threaded through another hole at 148 and fixed against pull-out by a crimped ferrule 62f to form the snare loop 52f. Received for relative movement in the remaining hole at 150 is a connecting member or arm 134f in the form of a rod fixed at one end to the slide lock 64f and having a stop 152 at its other end which precludes withdrawal of the rod from the plate. As will be appreciated, the length of the connecting rod 134f or position of the stop 152 thereon may be selected or adjusted to provide the desired amount of slack or lost motion indicated at L in FIG. 14.

Referring now to FIG. 15, still another type of lost motion locking slide device can be seen at 48g. The device 48g includes a generally U-shape saddle 50g having trailing leg portion 58g to which a locking pawl 80g is swingingly or pivotally connected. At its connecting portion 54g, the saddle is transversely recessed to provide a reduced width center section 156 which extends through a small loop or eye 158 formed at the loop end 36g of the cable 32g. The eye 158 is sufficiently large to allow longitudinal movement thereof along the reduced width center section 156 while being too small to slip longitudinally beyond such reduced width center section. Accordingly, such longitudinal movement of the cable loop end relative to the saddle will provide for limited introduction of slack into the snare loop 52g when an animal ceases tugging against the loop.

Figure 16:
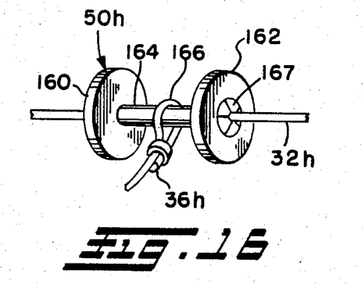
FIG. 16 is a perspective view of a modified form of lost motion locking slide device of the type seen in FIG. 15.
Figures 17, 18, 19, 20:
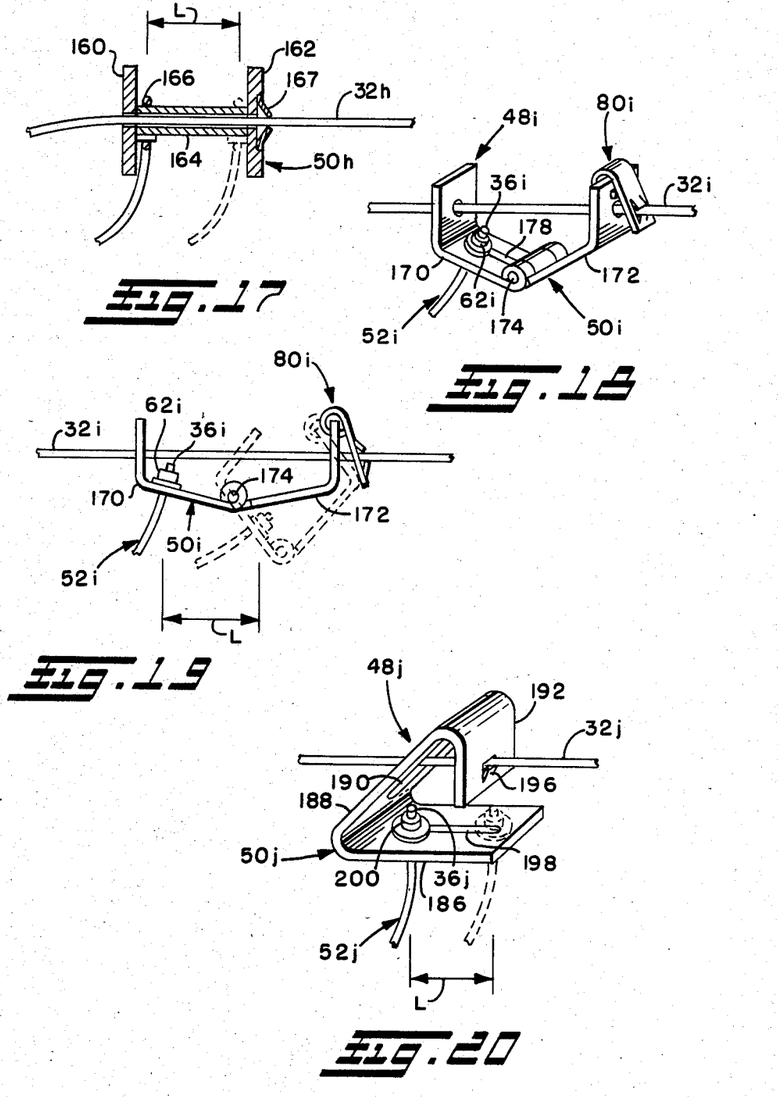
FIG. 17 is a longitudinal sectional view through the device of FIG. 16.
FIG. 18 is a perspective view of yet another type of lost motion locking slide device according to the invention utilizing hinged sliding members.
FIG. 19 is an elevational view of the device of FIG. 18 with tightened and relaxed conditions thereof being shown in solid and phantom lines, respectively.
FIG. 20 is a perspective view of a further type of lost motion locking slide device according to the invention.

In FIGS. 16 and 17, a tubular form of slide or saddle 50h can be seen to include a pair of transversely extending discs 160 and 162 at opposite ends of a reduced diameter tubular portion 164 through which the intermediate portion of the cable 32h is threaded. At its loop end 36h, the cable is formed into a small loop or eye 166 which is disposed about the tubular portion 164 for relative longitudinal movement which is limited by the larger diameter discs 160, 162 at the ends of such tubular portion. The saddle also is provided with a slide lock in the form of a slip disc 166 press fitted or otherwise secured in a counterbore provided in the disc 162. The slip disc 166 preferably is made of spring steel and has a center hole from which a number of slits or slots radiate to form a plurality of radially inwardly extending locking detents or tabs. The center hole has a smaller diameter than the diameter of the cable which is threaded therethrough whereby the tabs are biased outwardly from the plane of the disc to ride on the cable. The slip disc 166 operates to allow movement of the saddle in one direction while preventing movement in the reverse direction. When the saddle is locked against reverse movement, the loop end of the cable can move relative to the saddle for introduction of a limited amount of slack L into the loop.

Referring now to FIGS. 18 and 19, another type of lost motion locking slide device 48i can be seen to include a hinged slide 50i consisting of a pair of generally L-shape slide members 170 and 172 having short legs provided with holes through which the intermediate portion of the cable 32j is threaded. At the distal ends of their longer legs, the slide members are hinged together as seen at 174. The holes in the shorter legs are sufficiently large to allow pivoting or swinging of the slide members between an extended position and a closed or buckled position.

The leading slide member 170 further has a hole or longitudinal slot 178 in its longer leg through which the loop end 36i of the cable 32i is threaded and fixed against pull-out by a crimped ferrule 62i to form the snare loop 52i. Also, a locking pawl 80i is pivotally mounted on the short leg of the trailing slide member 172 for operative engagement with the cable to prevent any appreciable reverse movement of the trailing slide member along the cable.

In use, tugging by an animal against the snare loop will advance the leading slide member 170 along the cable 32i. This will cause the slide members to pivot to their extended condition seen in solid lines in FIG. 19 before the trailing slide member 172 will be advanced along the cable by the leading slide member. When the tightening action ceases, the slide members are free to buckle to allow the leading slide member and consequently the cable loop end 36i to move in the reverse direction so as to introduce slack into the snare loop 52i. Such swinging or buckling action further will urge the locking pawl 80i in binding or biting engagement with the cable to prevent reverse movement of the trailing slide member along the cable and also the leading slide member when the plates assume their closed or fully buckled condition shown in phantom lines in FIG. 19. This accordingly limits the amount of slack that can be introduced into the snare loop, such being indicated at L in FIG. 19.

In FIG. 20, still another type of lost motion locking slide device 48j can be seen to include a slide 50j in the form of a generally V-shape bent strip. One leg 186 of the slide extends generally parallel to the intermediate portion of the cable 32j while the other leg 188 extends at an angle to the cable and has a longitudinal slot 190 through which the cable is threaded. The angled leg 188 also terminates at a bent flange 192 extending toward and generally at right angles to the parallel leg 186. Such flange 192 has a hole through which the cable is threaded and a locking detent or tab 196 formed therefrom which rides on the cable and operates to prevent reverse movement of the slide along the cable.

As shown, the parallel leg 186 has a longitudinal slot 198 extending generally parallel to the intermediate portion of the cable 32j passing through the flange 192 and angled leg 188. The loop end 36j of the cable is threaded through such slot 198 and fixed against pull-out by a crimped ferrule 200. The width of the slot 198 is slightly greater than the outer diameter of the cable whereby the loop end of the cable is longitudinally movable in the slot between the positions seen in solid and phantom lines in FIG. 20. By reason of such relative movement, a preselected limited amount of slack L can be introduced into the snare loop 52j when an animal ceases tugging against such loop.

In view of the foregoing, the present invention can be seen to provide a relaxing snare characterized by a constrictable loop that is formed by a loop closure which allows constriction of the loop upon an animal tugging thereagainst while providing for the introduction of a predetermined amount of slack or looseness into the loop when the animal ceases tugging thereagainst. This prevents strangulation of the animal while ensuring retention of the animal in the snare.

Although the invention has been shown and described with respect to preferred embodiments, it is obvious that equivalent alterations and modifications will occur to others skilled in the art upon the reading and understanding of this specification. The present invention includes all such equivalent alterations and modifications, and is limited only by the scope of the following claims.

I claim:

1. A relaxing snare for trapping animals comprising noose means including flexible cable means having an anchor end and a loop end, said loop end being operably connected to an intermediate portion of said cable means for advancement along such intermediate portion of said cable means to form a constrictable loop for ensnaring an animal therein by tightening of said loop about the animal's neck upon the animal tugging thereagainst; and means for releasing the tightness of said loop upon cessation of such tugging by introducing a predetermined limited amount of slack, for retention of the snared animal without strangulation of the animal, said means for releasing including slide lock means advanceable along the intermediate portion of said cable means and bitingly engageable therewith to limit reverse movement of said slide lock means, and lost motion connection means between said loop end and said slide lock means for advancing said slide lock means along said cable means by the tightening action of said loop after the slack therein has been taken up and for reintroducing such slack into said loop upon cessation of the tightening action, and any such reverse movement of said slide lock means along said cable means being limited to an amount substantially less than the amount of slack in said lost motion connection means and essentially independent of the position of said slide lock means on said cable means.

2. A snare as set forth in claim 1, wherein said loop end is connected to a slide on said cable means, and said slide lock means is operable to limit reverse movement of said slide.

3. A snare as set forth in claim 2, wherein said lost motion connection means includes means for restricting relative movement between said slide and slide lock means to a predetermined amount.

4. A snare as set forth in claim 2, wherein said loop end is slidably connected to said slide for limited relative movement along said cable means.

5. A snare as set forth in claim 4, wherein said slide has a slot fixed ending generally parallel to the intermediate portion of said cable means at said slide, and said loop end is longitudinally movable in and fixed against pull-out from said slot.

6. A snare as set forth in claim 5, wherein said slide lock means and slide are joined together for common movement along said cable means.

7. A snare as set forth in claim 4, wherein said cable means has an eye at its loop end disposed about a center portion of said slide and movable thereon between trailing and leading abutments at opposite ends of said slide.

8. A snare as set forth in claim 2, wherein said slide includes a unitary bent strip having a first section and an angularly disposed second section terminating at a flange extending towards said first section, said second section and flange each having a hole through which the intermediate portion of said cable means is threaded, said flange further having a locking tab for preventing reverse movement of said strip along said cable means, and said first section having a longitudinal slot extending generally parallel to the intermediate portion of said cable means at said slide, said slot being sized to receive for longitudinal movement therein the loop end of said cable means which is connected to said slide against separation therefrom.

9. A relaxing snare for trapping an animal, comprising a flexible cable having an anchor end and a loop end, a slide mounted for sliding movement on said cable, means connecting said loop end to said slide to form a loop and to advance said slide to constrict said loop upon an animal tugging thereagainst, lock means advanceable along said cable and bitingly engageable with said cable to limit reverse movement of said lock means, and means for advancing said lock means along said cable by the tightening action of said loop after a predetermined amount of slack in said loop has been taken up and for reintroducing such slack into said loop upon cessation of such tightening action, and any such reverse movement of said lock means along said cable being limited to an amount substantially less than said predetermined amount of slack and essentially independent of the position of said lock means on said cable.

10. A snare as set forth in claim 9, wherein said means for advancing includes a lost motion connection between said loop end and said lock means.

11. A snare as set forth in claim 10, wherein said lost motion connection includes a slot in said slide, and means securing said loop end to said slide for longitudinal movement in said slot.

12. A snare as set forth in claim 10, wherein said lost motion connection includes means allowing movement of said loop end relative to said slide and between fixed points on said slide spaced longitudinally along said cable.

13. A snare as set forth in claim 10, wherein said lost motion connection includes means for restricting relative movement between said slide and said lock means to a predetermined amount.

14. A relaxing snare for trapping animals comprising noose means including flexible cable means having an anchor end and a loop end, said loop end being operably connected to an intermediate portion of said cable means for advancement along such intermediate portion of said cable means to form a constrictable loop for ensnaring an animal therein by tightening of said loop about the animal's neck upon the animal tugging thereagainst; and means for releasing the tightness of said loop upon cessation of such tugging by a predetermined limited amount, for retention of the snared animal without strangulation of the animal, said means for releasing including slide lock means advanceable along said cable means and engageable therewith to limit reverse movement of said loop end, and lost motion connection means between said loop end and said slide lock means for advancing said slide lock means along said cable means by the tightening action of said loop after the slack therein has been taken up and for reintroducing such slack into said loop upon cessation of the tightening action; said loop end being connected to a slide on said cable means, said slide lock means being operable to limit reverse movement of said slide, said lost motion connection means including means for restricting relative movement between said slide and slide lock means to a predetermined amount, said means for restricting including trailing and leading end portions of said slide which are longitudinally spaced apart along said cable means and disposed on opposite sides of said slide lock means, said trailing end portion being engageable with said lock means to advance the same along said cable means and said leading end portion being engageable with said slide lock means to limit reverse travel of said slide.

15. A relaxing snare for trapping animals comprising noose means including flexible cable means having an anchor end and a loop end, said loop end being operably connected to an intermediate portion of said cable means for advancement along such intermediate portion of said cable means to form a constrictable loop for ensnaring an animal therein by tightening of said loop about the animal's neck upon the animal tugging thereagainst; and means for releasing the tightness of said loop upon cessation of such tugging by a predetermined limited amount, for retention of the snared animal without strangulation of the animal, said means for releasing including slide lock means advanceable along said cable means and engageable therewith to limit reverse movement of said loop end, and lost motion connection means between said loop end and said slide lock means for advancing said slide lock means along said cable means by the tightening action of said loop after the slack therein has been taken up and for reintroducing such slack into said loop upon cessation of the tightening action; said loop end being connected to a slide on said cable means, said slide lock means being operable to limit reverse movement of said slide, said lost motion connection means including means for restricting relative movement between said slide and slide lock means to a predetermined amount, said slide lock means being located on said cable means to the rear of said slide, and said means for restricting including a tag-along lost motion connection between said slide lock means and said slide.

16. A relaxing snare for trapping animals comprising noose means including flexible cable means having an anchor end and a loop end, said loop end being operably connected to an intermediate portion of said cable means for advancement along such intermediate portion of said cable means to form a constrictable loop for ensnaring an animal therein by tightening of said loop about the animal's neck upon the animal tugging thereagainst; and means for releasing the tightness of said loop upon cessation of such tugging by a predetermined limited amount, for retention of the snared animal without strangulation of the animal, said means for releasing including slide lock means advanceable along said cable means and engageable therewith to limit reverse movement of said loop end, and lost motion connection means between said loop end and said slide lock means for advancing said slide lock means along said cable means by the tightening action of said loop after the slack therein has been taken up and for reintroducing such slack into said loop upon cessation of the tightening action; said loop end being connected to a slide on said cable means, said slide lock means being operable to limit reverse movement of said slide, said slide including a single strip to which said loop end is fixed, said strip having a first hole by which it is slidably mounted on the intermediate portion of said cable means and a second hole through which a connecting rod movably extends in generally parallel relationship with the intermediate portion of said cable means at said slide, and said connecting rod having one end fixed to said slide lock means and a stop at its other end which prevents longitudinal withdrawal of said rod from said single strip.

17. A relaxing snare for trapping animals comprising noose means including flexible cable means having an anchor end and a loop end, said loop end being operably connected to an intermediate portion of said cable means for advancement along such intermediate portion of said cable means to form a constrictable loop for ensnaring an animal therein by tightening of said loop about the animal's neck upon the animal tugging thereagainst; and means for releasing the tightness of said loop upon cessation of such tugging by a predetermined limited amount, for retention of the snared animal without strangulation of the animal, said means for releasing including slide lock means advanceable along said cable means and engageable therewith to limit reverse movement of said loop end, and lost motion connection means between said loop end and said slide lock means for advancing said slide lock means along said cable means by the tightening action of said loop after the slack therein has been taken up and for reintroducing such slack into said loop upon cessation of the tightening action; said lost motion connection means including a pair of hinged members mounted at their unhinged ends for sliding movement on said cable means and connected, respectively, to said loop end and slide lock means.

18. A relaxing snare for trapping an animal, comprising a flexible cable having an anchor end and a loop end, a slide mounted for sliding movement on said cable, means connecting said loop end to said slide to form a loop and to advance said slide to constrict said loop upon an animal tugging thereagainst, lock means engageable with said cable to limit reverse movement of said slide, and means for advancing said lock means along said cable by the tightening action of said loop after a predetermined amount of slack in said loop has been taken up and for reintroducing such slack into said loop upon cessation of such tightening action, said means for advancing including a lost motion connection between said loop end and said lock means, said lost motion connection having trailing and leading members longitudinally spaced apart along said cable on opposite sides of said lock means, said trailing end member being engageable with said lock means to advance the same along said cable and said leading end member being engageable with said lock means to limit reverse travel of said slide to a predetermined distance.

* * * * *